Aug. 30, 1949.                     A. FRUM                        2,480,128
                         FREQUENCY MEASURING SYSTEM
                             Filed Oct. 3, 1945

INVENTOR.
ALEXANDER FRUM
BY
R P Morris
ATTORNEY

Patented Aug. 30, 1949

2,480,128

UNITED STATES PATENT OFFICE 2,480,128

FREQUENCY MEASURING SYSTEM

Alexander Frum, New York, N. Y., assignor to Federal Telephone and Radio Corporation, New York, N. Y., a corporation of Delaware Application October 3, 1945, Serial No. 620,145

7 Claims. (Cl. 343—106)

This invention relates to a frequency measuring system and more particularly to a system which will provide a precise measurement of frequency within a given frequency range.

In a copending application of E. Labin and D. D. Grieg, Serial No. 581,974, filed March 10, 1945, a system is described wherein the azimuth direction of a receiver with respect to a beacon may be obtained by comparison of the amplitude of signals varying as sine and cosine functions of the rotary angular position of the beacon beam. Other omnidirectional beacons have been generally proposed wherein a directive beam is rotated and the frequency of the carrier wave or a modulating signal is varied in accordance with the angular position of the beam. In such a system it is merely necessary to provide an accurate frequency measuring device in order to obtain the azimuth direction with respect to the beacon. An accurate frequency measuring system also has many other applications in the field, for example, in monitoring the frequency of a transmitting station or measuring the frequency deviation of an FM transmitter.

It is an object of my invention to provide a method and means for measuring the frequency of energy within a given frequency range.

It is another object of my invention to provide a frequency measuring method and means wherein the frequency to be measured is divided into two components having a phase shift there-between proportional to the frequency and measuring this phase shift.

It is a further object of my invention to provide a system for measuring the phase between two waves of the same frequency by producing voltages varying in accordance with the sine and cosine functions respectively, of the predetermined phase displacement and comparing these voltages.

It is a still further object of my invention to provide a frequency measuring system wherein the wave to be measured is divided into two waves having a predetermined phase displacement dependent upon the frequency and measuring this phase displacement by reducing the phase difference into two voltages varying as sine and cosine respectively, of the phase difference angle and comparing these voltages.

According to a feature of my invention, energy from a source whose frequency is to be measured is divided into two components, one component having a phase displacement relative to the other component dependent upon the frequency to be measured. One of these components is phase shifted 90°. The direct energy is combined in a ring bridge circuit with the energy which has been shifted in phase in accordance with frequency to derive an output voltage equivalent to the cosine function of the phase angle. The 90° phase shifted component is also combined in another bridge circuit with the other component to derive a voltage representative of the sine function of the phase angle. These two voltages may then be compared in a ratiometer. Since the output amplitudes of the two ring bridge circuits will vary in accordance with the sine and cosine functions of the frequency within a given band, the ratiometer may be directly calibrated to provide an indication of frequency. If the system is used in conjunction with a rotatable beam of an omnidirectional beacon, it may be desirable to integrate the output of the ring bridge circuits prior to comparison so that a measurement equivalent to the center of the beam may be obtained.

While I have outlined above the broad objects and features of my invention, a better understanding of my invention and the objects and features thereof may be had from the particular description thereof made with reference to the accompanying drawing, in which:

Fig. 1 is a schematic circuit diagram partly in block form of a frequency measuring system embodying the features of my invention; and Fig. 2 is a graph used in explaining the characteristics of one of the elements used in the circuit of Fig. 1.

Referring specifically to the drawing, a source whose frequency is to be measured is indicated at 1. This source may, for example, be the output of a radio receiver or a monitoring circuit coupled to a frequency modulated transmitter. Energy from source 1 is applied over branch line 2 to a filter 3. This filter 3 has a band-pass characteristic such that within the frequency range of signals to be measured the attenuation is substantially constant. Referring to Fig. 2, the attenuation characteristic of filter 3 may be represented by curve 4 which has a substantially flat portion 5 of constant attenuation. The frequency band over which such a filter could operate proportionally is indicated by the limit lines 6 and 7. In event the attenuation of filter network 3 is not entirely flat over the entire range, an automatic volume control amplifier 8 may be coupled in the output of filter 3 to equalize any variations in amplitude. Such a filter network as that shown in 3 will produce a phase shift in the energy passed therethrough dependent upon the applied frequency within the given frequency band. Thus, in the output of amplifier 8 there is applied to a line 9 a component of the input frequency having a predetermined phase displacement with respect to the input wave.

A branch line 10 coupled to the output of source 1 carries the input wave component. The input wave component over line 10 may also be applied to a 90° phase shifter 11 which produces a phase shift of 90° in this component. This phase shifted energy may be then applied to an amplifier 12 which may be provided with an automatic volume control, if desired, to maintain the amplitude level of the input energies applied to phase discriminator 14 somewhere near constant value. However, so long as these energies are large with respect to the energy of the other phase deviated component, the output amplitude of amplifier 12 is not critical.

A phase discriminating rectifier arrangement for the input energy from line 10 and the output energy from line 9 is shown generally at 13. This phase discriminator serves to produce output energy varying in accordance with a cosine function of the phase deviation angle. A second phase discriminating rectifier network 14 is shown to which the output energy from amplifier 12 and the output energy of line 9 is applied. Because of the 90° phase shift, the output energy from this network will be proportional to a sine function of the phase shift angle. These two output voltages may be applied over integrating circuits 15 and 16 respectively, to a metering circuit 17 which preferably is a simple ratiometer. Integrator circuits 15 and 16 are desirable when the unit is used for measuring the frequency of a rotatable beam since in that case the measurements take place over a period of time in which there is some deviation of input frequencies and therefore an integration is desirable in order that the mean frequency may be determined.

The phase discriminating networks 13 and 14 may be of any desired type but for purpose of illustration, rectifier ring bridge arrangements have been illustrated. The discriminator 13, for example, comprises four rectifier elements 18, 19, 20 and 21 arranged in a bridge form as shown. Input energy from line 9 may be applied across one diagonal of the bridge over transformer 22. The output energy is taken directly across the other diagonal of the bridge as over line 23 and applied to meter 17. The other input component is applied from line 10 over transformer 24, the secondary of which is coupled between the midpoints of the secondary of transformer 22 and a shunt impedance 25 shunted across the same diagonal of the bridge as line 23 is connected. While impedance 25 has been shown as a coil, it is clear that a resistance or other impedance may be used, it being necessary only to provide a system so that the mid-point may be tapped for the coupling of the secondary of transformer 24. It will be clear then that in line 23 the resultant of the energy applied to phase discriminator 13 over transformers 22 and 24 will be of zero frequency since the same frequency is applied to the bridge at both points but will have a value dependent upon the phase displacement of the energy applied to the two inputs. Thus, this output energy will be a D. C. voltage proportional to the cosine of the phase shift angle. The phase discriminator 14 is precisely identical with 13. It is composed, for example, of four rectifiers 26, 27, 28 and 29 across one diagonal of which is applied energy from line 9 over transformer 30 and across the other diagonal which is coupled to the output line 31. A shunting impedance 32 is provided across the output line diagonal to the bridge and a transformer 33 coupled to the output of amplifier 4 is provided for this secondary connected between the mid-points of the secondary of transformer 30 and impedance 32. The input energy applied at transformer 33 is 90° out-of-phase with that applied at transformer 24 to discriminator 13. As a consequence, the output voltage will be shifted 90° with respect to the output voltage of discriminator 13 and so will be representative of the sine of the phase shift angle instead of the sine.

It will be clear that if desired 90° phase shifter 11 may be inserted in line 9 ahead of discriminator 14 instead of in line 10 as shown. It is further clear that this circuit arrangement without the integrator circuits 15 and 16 may be used for measuring the frequency of input energy for any desired purpose. Furthermore, it is clear that while the system provides an arrangement for frequency measuring, the same principles may be applied to secure a precise phase angle measurement, if desired. For application of the system for phase measurement, filter 3 and amplifier 8 may be dispensed with, one of the waves being then applied over transformers 24 and 33 directly over line 10 to the phase discriminator inputs while the other wave, whose phase deviation is to be measured, may be applied directly over line 9 and transformers 22 and 30 to the phase discriminators 13 and 14. Meter 17 then should be calibrated directly in phase instead of in frequency as is the case when the system is used for frequency measurement.

In general, a phase shifter such as shown at 11 may be made quite readily to produce 90° phase shift over a relatively wide frequency band. However, in such a case, the attenuation of the phase shifter may vary greatly with change in frequency. However, in accordance with the present invention, the phase discriminators 13 and 14 are not critical as the differences in the amplitude of the input energy so long as the amplitude of one of the energies is maintained large with respect to the other input amplitude. Accordingly, considerable variation in amplitude of the input signal to discriminator 14 can be tolerated without causing any appreciable error in the meter readings. It should further be clear that while I have shown the specific characteristics for filter 3, it is immaterial whether band-pass characteristics of the filter are limited to the band to be received so long as its characteristic is sufficiently wide to accept the entire band which is to be measured.

While I have disclosed my invention in connection with a particular circuit arrangement, it will be clear that many different types of circuits utilizing the principles of my invention will readily occur to those skilled in the art. It is therefore to be clearly understood that the particular embodiment disclosed herein is made similar by way of illustration and is not to be considered as any limitation of my invention as set forth in the objects thereof and in the accompanying claims.

I claim:

1. A system for measuring the frequency of energy comprising means for producing a proportional phase shift of said energy dependent upon the frequency of said energy, means for combining said phase shifted energy and said energy to be measured to provide an output voltage proportional to the cosine of the phase shift angle, phase shifting means for shifting the phase of said energy to be measured substantially ninety degrees, means for combining said proportionally phase shifted energy and said ninety degree phase shifted energy to produce a second output voltage proportional to the sine of said proportional phase shift angle, and means for comparing said output voltages.

2. A system for measuring the frequency of a given wave within a predetermined frequency range comprising a band-pass filter producing a phase shift proportional to frequency within said band and having a substantially constant attenuation throughout said band, means for applying said wave to said filter whereby a wave component having a phase displacement relative to said input wave component dependent upon said frequency is produced, a pair of phase discriminator means each having an output voltage circuit, means for applying one wave component cophasally to each of said discriminator means, means for applying the other wave component to said discriminator means in phase quadrature, whereby the outputs of said discriminators will be voltages proportional to the sine and cosine values respectively, of the phase displacement angle, and means for comparing output voltages.

3. A system for measuring the frequency of a given wave within a predetermined frequency range comprising a band-pass filter producing a phase shift proportional to frequency within said band and having a substantially constant attenuation throughout said band, means for applying said wave to said filter whereby a wave component having a phase displacement relative to said input wave component dependent upon said frequency is produced, a pair of phase discriminator means each having a direct current output circuit, means for applying one wave component cophasally to each of said discriminator means, means for applying the other wave component to each said discriminator means in phase quadrature, whereby the outputs of said discriminators will be at voltages proportional to the sine and cosine values respectively, of the unphase displacement angle, a ratiometer, and means for applying said direct current output voltages to said ratiometer.

4. A system for measuring the frequency of a given wave within a predetermined frequency range comprising a filter producing a phase shift dependent upon frequency, means for applying said wave to said filter whereby a wave component having a phase displacement relative to said input wave component dependent upon said frequency is produced, a pair of phase discriminator means each having an output voltage circuit, a phase shifter for producing a ninety degree phase shift of frequencies within said band, means for applying one of said wave components to said phase shifter, means for applying said phase displaced wave component to each of said phase discriminators, means for applying the unshifted wave component to one of said discriminator means, and the ninety degree phase shifted component to the other discriminator means whereby the output voltages will be proportional to sine and cosine function respectively, of the phase displacement angle, and means for comparing said output voltages.

5. A receiver system for use with a radio movable beacon which transmits signals varying in frequency over a given band for different directions, comprising means for receiving energy from said beacon, a band-pass filter producing a phase shift proportional to frequency within said band and having a substantially constant attenuation throughout said band, means for applying a portion of said energy to said filter whereby a wave component having a phase displacement relative to the original energy component dependent upon said frequency is produced, a pair of phase discriminator circuits each having an output circuit for direct current, a phase shifter for producing a ninety degree phase shift of frequencies within said band, means for applying one of said above named wave components to said phase shifter, means for applying said phase displaced wave component to each of said discriminator circuits, means for applying the original energy wave component to one of said discriminator circuits, and the ninety degree phase shifted component to the other discriminator circuit whereby the direct current outputs will be at voltages proportional to the sine and cosine values respectively, of the phase displacement angle, a ratiometer, and means for applying said direct current output voltages to said ratiometer to produce an indication of the direction toward said beacon.

6. A system for measuring the frequency of a given wave within a predetermined frequency range, comprising a band-pass filter producing a phase shift proportional to frequency within said band and having a substantially constant attenuation throughout said band, means for applying said wave to said filter whereby a wave component having a phase displacement relative to said input wave component dependent upon said frequency is produced, a pair of ring bridge phase discriminator circuits each having an output circuit for direct current, a phase shifter for producing a ninety degree phase shift of frequencies within said band, means for applying one of said wave components to said phase shifter, means for applying said phase displaced wave component to each of said ring bridge discriminator circuits, means for applying the unshifted other wave component to one of said discriminator circuits, and the ninety degree phase shifted component to the other discriminator circuit whereby the direct current outputs will be at voltages proportional to the sine and cosine values respectively, of the phase displacement angle, a ratiometer, and means for applying said direct current output voltages to said ratiometer.

7. A system for measuring the frequency of energy comprising means for producing components of said energy having a relative phase difference dependent upon said frequency, phasing means for producing a ninety degree phase shift of one of said waves, means for separately intermodulating the other of said waves with said one wave before and after said ninety degree phase shift to produce two voltages proportional to the sine and cosine respectively, of the phase difference angle, and means for comparing the two voltages.

ALEXANDER FRUM.

REFERENCES CITED

The following references are of record in the file of this patent:

UNITED STATES PATENTS

| Number | Name | Date |
|---|---|---|
| 2,274,546 | Hugenholtz | Feb. 24, 1942 |
| 2,305,614 | Goldstein | Dec. 22, 1942 |
| 2,366,628 | Koch | Jan. 2, 1945 |
| 2,405,073 | Troell | July 30, 1946 |
| 2,410,386 | Miller | Oct. 29, 1946 |
| 2,411,916 | Woodyard | Dec. 3, 1946 |

FOREIGN PATENTS

| Number | Country | Date |
|---|---|---|
| 450,400 | Great Britain | July 13, 1936 |